United States Patent [19]

Johnson et al.

[11] Patent Number: 4,730,312
[45] Date of Patent: Mar. 8, 1988

[54] VOICE, DATA OR BOTH OVER ONE TELEPHONE LINE IN A T-1 CARRIER SYSTEM

[75] Inventors: Robert D. Johnson, Newport Beach; George A. Merritt, Jr., Irvine; Terry L. Dawson, Laguna Beach, all of Calif.

[73] Assignee: San/Bar Corporation, Irvine, Calif.

[21] Appl. No.: 832,451

[22] Filed: Feb. 21, 1986

[51] Int. Cl.[4] ............................................... H04J 3/12
[52] U.S. Cl. .................................................. 370/110.1
[58] Field of Search ........................ 370/110.1, 99, 111

[56] References Cited

U.S. PATENT DOCUMENTS

| | | | |
|---|---|---|---|
| 3,030,448 | 4/1962 | Leonard et al. | 370/110.1 |
| 3,549,814 | 12/1970 | Jaeger, Jr. et al. | 370/110.1 |
| 3,821,478 | 6/1974 | Hillman, Jr. et al. | 370/110.1 X |
| 4,467,469 | 9/1984 | Krikor | 370/99 X |
| 4,476,559 | 10/1984 | Brolin et al. | 370/110.1 |

FOREIGN PATENT DOCUMENTS 2063018  5/1981  United Kingdom ................ 370/111

OTHER PUBLICATIONS

Motorola Inc. Telecommunications Device Data, 1984, pp. 2-279-2-332, pp. 2-279-2-332, and 3-23-3-36.
T. A. Abele and A. J. Schepris, "Overview", AT&T Bell Laboratories Technical Journal, vol. 63, No. 10, Dec. 1984, pp. 2273-2281.
M. M. Luniewicz, J. W. Olson, and K. E. Stiefel, "Channel Bank", AT&T Bell Laboratories Technical Journal, vol. 63, No. 10, Dec. 1984, pp. 2283-2331.

Primary Examiner—Douglas W. Olms
Assistant Examiner—Melvin Marcelo
Attorney, Agent, or Firm—Jackson & Jones

[57] ABSTRACT

A standard T-1 span is connected to a digital central office or remote terminal. Telephone equipment for such a T-1 span defines a superframe format with each frame of the twelve frames of a superframe having twenty-four eight-bit position time slots. Telephone system signalling requires T-1 signalling bits be located in the least significant bit position of each time slot in every sixth frame. In the disclosed system, simultaneous digitized voice and data share a single time slot for transmission along with the T-1 signalling bits in that time slot. In order to achieve the additional capability, the disclosed system employs least and next-to-least digitized voice bit swapping and a data bit occupying the space of the swapped least significant digitized voice bit, which bit is deleted.

22 Claims, 8 Drawing Figures

| FRAME # | F | d1 | d2 | d3 | d4 | d5 | d6 | d7 | d8 |
|---|---|---|---|---|---|---|---|---|---|
| 1 | 1 | $V_1$ | $V_2$ | $V_3$ | $V_4$ | $V_5$ | $V_6$ | D | $V_7$ |
| 2 | 0 | $V_1$ | $V_2$ | $V_3$ | $V_4$ | $V_5$ | $V_6$ | D | $V_7$ |
| 3 | 0 | $V_1$ | $V_2$ | $V_3$ | $V_4$ | $V_5$ | $V_6$ | D | $V_7$ |
| 4 | 0 | $V_1$ | $V_2$ | $V_3$ | $V_4$ | $V_5$ | $V_6$ | D | $V_7$ |
| 5 | 1 | $V_1$ | $V_2$ | $V_3$ | $V_4$ | $V_5$ | $V_6$ | D | $V_7$ |
| 6 | 1 | $V_1$ | $V_2$ | $V_3$ | $V_4$ | $V_5$ | $V_6$ | D | A |
| 7 | 0 | $V_1$ | $V_2$ | $V_3$ | $V_4$ | $V_5$ | $V_6$ | D | $V_7$ |
| 8 | 1 | $V_1$ | $V_2$ | $V_3$ | $V_4$ | $V_5$ | $V_6$ | D | $V_7$ |
| 9 | 1 | $V_1$ | $V_2$ | $V_3$ | $V_4$ | $V_5$ | $V_6$ | D | $V_7$ |
| 10 | 1 | $V_1$ | $V_2$ | $V_3$ | $V_4$ | $V_5$ | $V_6$ | D | $V_7$ |
| 11 | 0 | $V_1$ | $V_2$ | $V_3$ | $V_4$ | $V_5$ | $V_6$ | D | $V_7$ |
| 12 | 0 | $V_1$ | $V_2$ | $V_3$ | $V_4$ | $V_5$ | $V_6$ | D | B |

| FRAME # | F | d1 | d2 | d3 | d4 | d5 | d6 | d7 | d8 |
|---|---|---|---|---|---|---|---|---|---|
| 1 | 1 | $V_1$ | $V_2$ | $V_3$ | $V_4$ | $V_5$ | $V_6$ | D | $V_7$ |
| 2 | 0 | $V_1$ | $V_2$ | $V_3$ | $V_4$ | $V_5$ | $V_6$ | D | $V_7$ |
| 3 | 0 | $V_1$ | $V_2$ | $V_3$ | $V_4$ | $V_5$ | $V_6$ | D | $V_7$ |
| 4 | 0 | $V_1$ | $V_2$ | $V_3$ | $V_4$ | $V_5$ | $V_6$ | D | $V_7$ |
| 5 | 1 | $V_1$ | $V_2$ | $V_3$ | $V_4$ | $V_5$ | $V_6$ | D | $V_7$ |
| 6 | 1 | $V_1$ | $V_2$ | $V_3$ | $V_4$ | $V_5$ | $V_6$ | D | A |
| 7 | 0 | $V_1$ | $V_2$ | $V_3$ | $V_4$ | $V_5$ | $V_6$ | D | $V_7$ |
| 8 | 1 | $V_1$ | $V_2$ | $V_3$ | $V_4$ | $V_5$ | $V_6$ | D | $V_7$ |
| 9 | 1 | $V_1$ | $V_2$ | $V_3$ | $V_4$ | $V_5$ | $V_6$ | D | $V_7$ |
| 10 | 1 | $V_1$ | $V_2$ | $V_3$ | $V_4$ | $V_5$ | $V_6$ | D | $V_7$ |
| 11 | 0 | $V_1$ | $V_2$ | $V_3$ | $V_4$ | $V_5$ | $V_6$ | D | $V_7$ |
| 12 | 0 | $V_1$ | $V_2$ | $V_3$ | $V_4$ | $V_5$ | $V_6$ | D | B |

FIG. 5b

VOICE, DATA OR BOTH OVER ONE TELEPHONE LINE IN A T-1 CARRIER SYSTEM

BACKGROUND OF THE INVENTION

1. Origin of the Invention

This invention is the result of the co-inventors' recognition of a long-standing, unresolved problem and the realization of means for solving that problem. The invention is assigned by the co-inventors to the co-inventors' corporate employer.

2. Field of the Invention

The invention is related to the field of digital data transmission, and, more particularly, to digital data transmission in a T-1 carrier system, wherein a user may telephone over a telephone port or transmit data over a data port. Such signals from a user location are respectively transmitted in analog or digital format to a channel bank, which is commonly associated with telephone operating companies' digital loop T-1 carrier systems. Typical of such channel banks are types known as D1, D4 and SLC banks.

3. Description of the Prior Art

In the evolution of plain, ordinary telephone systems to a shared use of telephone and data, the telephone companies have responded by numerous equipment changes. First, the telephone companies reduced the number of pairs of wires by the introduction of carrier systems. For example, with a group of 24 plain, ordinary telephones, the number of dedicated copper pairs would also be 24 (i.e., one pair for each telephone). The number of required pairs of wires were reduced when the telephone companies introduced the carrier system approach. In the T-1 approach, 24 pairs of copper wires were reduced to a single "T-1" carrier span, wherein each T-1 span is a conditioned two-wire transmit line and a conditioned two-wire receive line. The T-1 span transmits digital signals at a rate of 1.544 Mb/sec., and channel bank equipment is provided at each end of every T-1 span. Each channel bank includes analog-to-digital and digital-to-analog converters for adapting the signals from ordinary telephones to central office digital equipment and back to telephones.

With the advent of the more recent extended digital central offices, the number of analog-to-digital conversions were reduced. Digital T-1 spans were extended from a digital central office to a remote terminal location. That remote terminal location may, for example, be assigned to several large office buildings having a high number of telephones. The number of T-1 spans would be chosen in accordance with the telephone density. At the remote terminal, an analog-to-digital conversion is still required in order to provide an interface from plain, ordinary telephones to digital system equipment.

In today's extended digital systems a user requires one channel unit port for telephone and a different channel unit port for data. The data port in this prior art system is a dedicated data port in that the central office can send data only to a predetermined location. The central office was thus able to assure that no analog portion of a dial-up network would interfere with the data transmission. Neither voice nor dial-up capability was available over that dedicated data port.

In the use of T-1 spans, channel bank units are at a central office terminal or at a remote terminal. Time slots are assigned for each input port, and each input port is associated with an analog telephone. A data terminal at a user's location can also have a time slot assigned to it, in which the data terminal time slot is on the above-noted available predetermined basis. An assigned time slot, for ease and simplicity of explanation, is referred to in this application as a telephone "line".

The remote and central office terminals employ signalling bits, which are transmitted over the T-1 spans for control purposes. When one port is used for voice, it is known to rob the least significant bit from every sixth sample for signalling purposes. That robbed bit is forced to a given binary condition to indicate a signalling function such as on-hook/off-hook, or ringing of the telephone.

If no voice is being transmitted, a high-speed data port could be connected between predetermined users over a T-1 span. The robbed bit technique is still employed for control functions by the telephone company. That robbed bit requirement reduces the data port for a T-1 span to its maximum rate of 56 kb/sec.

Digital telephones and a digital private branch exchange (PBX) are today well known. Various semiconductor manufacturers supply off-the-shelf chip sets to build digital telephones and PBX line cards. A Motorola Inc. manual entitled "Telecommunications Device Data", copyrighted in 1984, at pages 2-279 through 2-332 and 3-23 through 3-36, is a typical description of such chip sets.

The digital PBX, as described in the Motorola manual and as commonly understood, keeps data separate from digitized voice. The Motorola PBX chip also has a mode to add voice plus data by robbing the eighth bit, but it is for communication within the local PBX premises. The PBX chip routes data locally among the PBX users, but does not directly pass that data out over any terminal or T-1 spans into the telephone system. If a PBX user desires that data be transmitted over a T-1 span, either a modem for an analog telephone time slot, or a time slot assigned for data transmission to a predetermined location, must be employed. Simultaneous voice and data over one telephone "line" or time slot over T-1 spans is not available in such PBX systems.

The telephone companies are, today, hopeful of providing an all-digital network with universal standards. Such hopes have been slow to materialize, and most of the voice and data industry recognize that analog system links are still prevalent in routing of any dialed-up telephone system.

A desperate need has thus gone unfulfilled in that digital telephone user requirements for simultaneous dial-up voice and data over T-1 spans have not been satisfied. This invention meets most of today's data requirements, plus supplying simultaneous or alternate voice over a dial-up call placed over T-1 spans in a highly efficient manner.

SUMMARY OF THE INVENTION

The method and apparatus of this invention realizes an improvement in data transmission systems for use with an all-digital telephone and alternative high-speed data or voice and low-speed data over the same commonly-assigned time slot, or telephone "line" in a carrier system. A user can dial a remote location, and if an all-digital network connection has been achieved, the users can share voice, followed by high-speed data and then voice again, if desired. The user can selectively alternate at his command whether a single port on the premises will transmit voice in a digitized format or, alternatively, that single port can transmit data at a maximum rate which is limited by the number of bits/second that have been set aside for signalling and control purposes. In this invention, each T-1 span is extended from a remote terminal to the user's voice/data telephone terminal location.

A digital multiplexer is provided in this invention in order to handle the T-1 information and provide:

(1) A voice only mode with digitized voice at 64 kb/sec., (2) a high speed (56 kb/sec.) data only mode, (3) a simultaneous voice and data mode, through the T-1 facility to any user, or (4) a local, data mode independent of (1) through (3) above.

BRIEF DESCRIPTION OF THE DRAWINGS

FIG. 5a and 5b depicts framing and signalling functions; and

DETAILED DESCRIPTION OF THE DRAWINGS

Figure 1A:
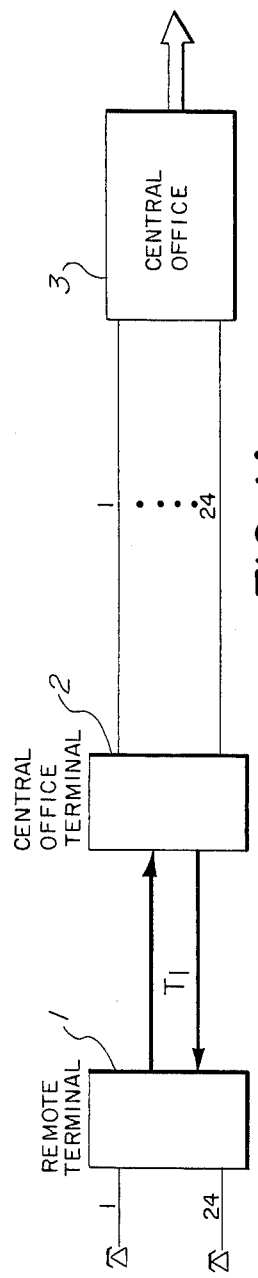
FIG. 1 includes prior art FIGS. 1A and 1B.

FIG. 1A depicts the aforementioned use of one T-1 span to accommodate 24 analog telephones. Remote terminal 1 includes channel bank cards that convert analog signals into digital words which are assigned to telephone "lines" or time slots. Each slot in the non-concentrated mode of FIG. 1A is dedicated to a single analog telephone input. Each T-1 span can handle 24 such time slots. Signalling control is provided between the remote and central office terminals 2 and 3, respectively.

D-1, D-4, SLC 40 and SLC 96 are typical types of well-known carrier channel banks at remote and central office locations 1 and 2. These types of channel banks are prevalent throughout the existing telephone network in the United States. These channel units are well known and are described in detail in various publications by the Bell Telephone System. The SLC 96 subscriber loop carrier system is described in detail in AT&T Bell Laboratories Technical Journal, Vol. 63, No. 10, December 1984. That publication also describes T-1, D-1, D-4 and other prior art equipment of the type depicted and described in connection with this invention.

Figure 1B:
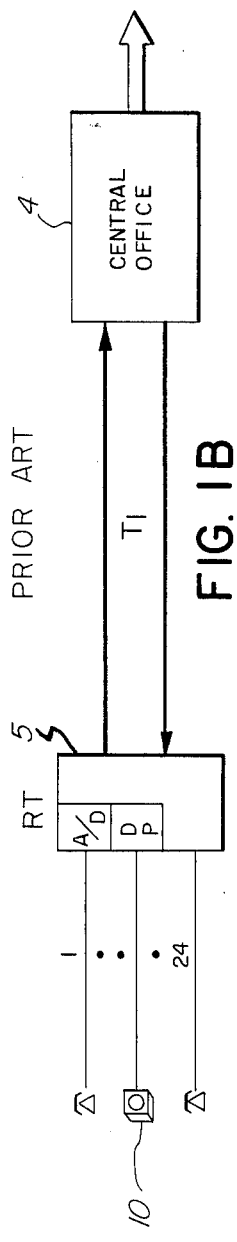

FIG. 1B depicts the more recently-introduced digital central office 4 which employs T-1 carriers between it and a remote terminal 5 of the D-1, D-4 or SLC type. At terminal 5, an analog telephone for one port or a data terminal 10 for another port is available at a user's location. A data terminal 10 may typically be a standard computer data output or a modem which emits digital data up to 56 kb/sec. In either event, however, two separate and dedicated ports are mandatory.

The system of this invention provides enhanced capabilities for a user with either type of analog or digital central office. The user, however, can selectively alternate between voice and data over a single time slot or telephone wire and do so without a central office even knowing that such activity is taking place at a user's location.

Figure 2:
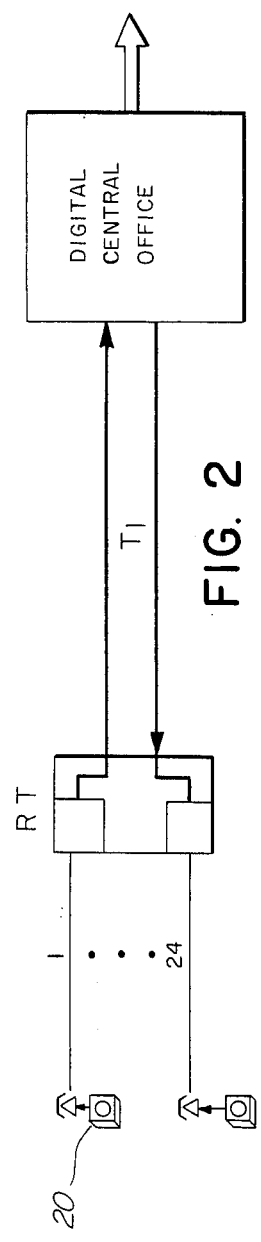
FIG. 2 depicts the basic block diagram of the system of this invention.

FIG. 2 depicts the system of this invention and shows that a user at location 20 has the option of either data or voice over a single telephone line. These, and other features of this invention, will now be described in conjunction with a description of FIG. 3.

Figure 3:
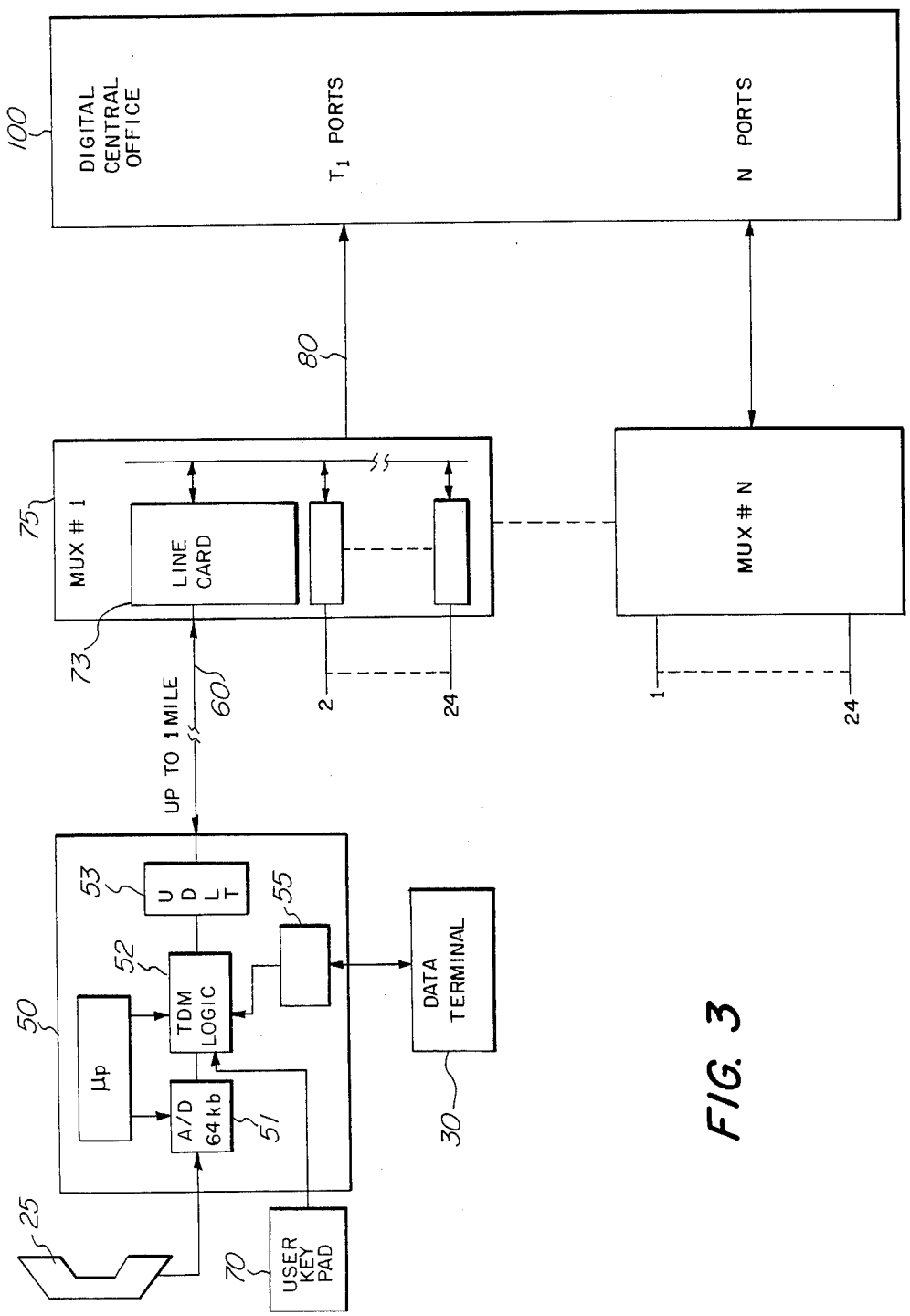
FIG. 3 is a more detailed block diagram of FIG. 2 in accordance with this invention.

FIG. 3 depicts a telephone handset 25 of any well known type and a data terminal 30 of any well known type within the speed limitations set forth herein. The digitizing unit 50 in accordance with this invention conditions the analog signals from the transmitter part of handset 25 by an analog-to-digital converter 51. The digital output of converter 51 is applied to a time-division multiplex logic circuit 52. A suitable data interface circuit 55 also applies data to logic circuit 52.

The logic circuit 52 handles either digitized voice alone, data alone, or digitized voice mixed with a more limited speed of data, depending upon the mode chosen by a user. The mode is selected by a user key pad 70. A universal data link transceiver 53 receives the logic output signals and supplies them over a conventional two-wire transmit and receive line 60 that is suitable for handling up to eighty kilobits per second. Such lines will readily handle 80 kb/sec. for a distance up to one mile for example.

The digital phone of this invention sends out, over line 60, digitized voice at 64 kb/sec., data at 8 kb/sec., and signalling information at 8 kb/sec. The signalling information channel is used to send commands to the multiplexer 75. A processor at the multiplexer location responds to the signalling commands by either routing messages locally or by sending messages out over a T-1 span. If the message for a T-1 span is to include data, the data must be stuffed into the T-1 format before it is sent out over the T-1 span.

Voice at the phone location is digitized by any conventional 8 bit encoder 51 such as an eight bit PCM encoder. Such encoders are known in the art as codecs. When data is to be stuffed into the signal that is scheduled for transmission over a T-1 span, the encoded seventh and eight codec bits are position-swapped. Data then is substituted into the 7th bit location (8th voice bit is deleted) and signalling robs the 8th bit location (7th voice bit being substituted therein).

Figure 4:
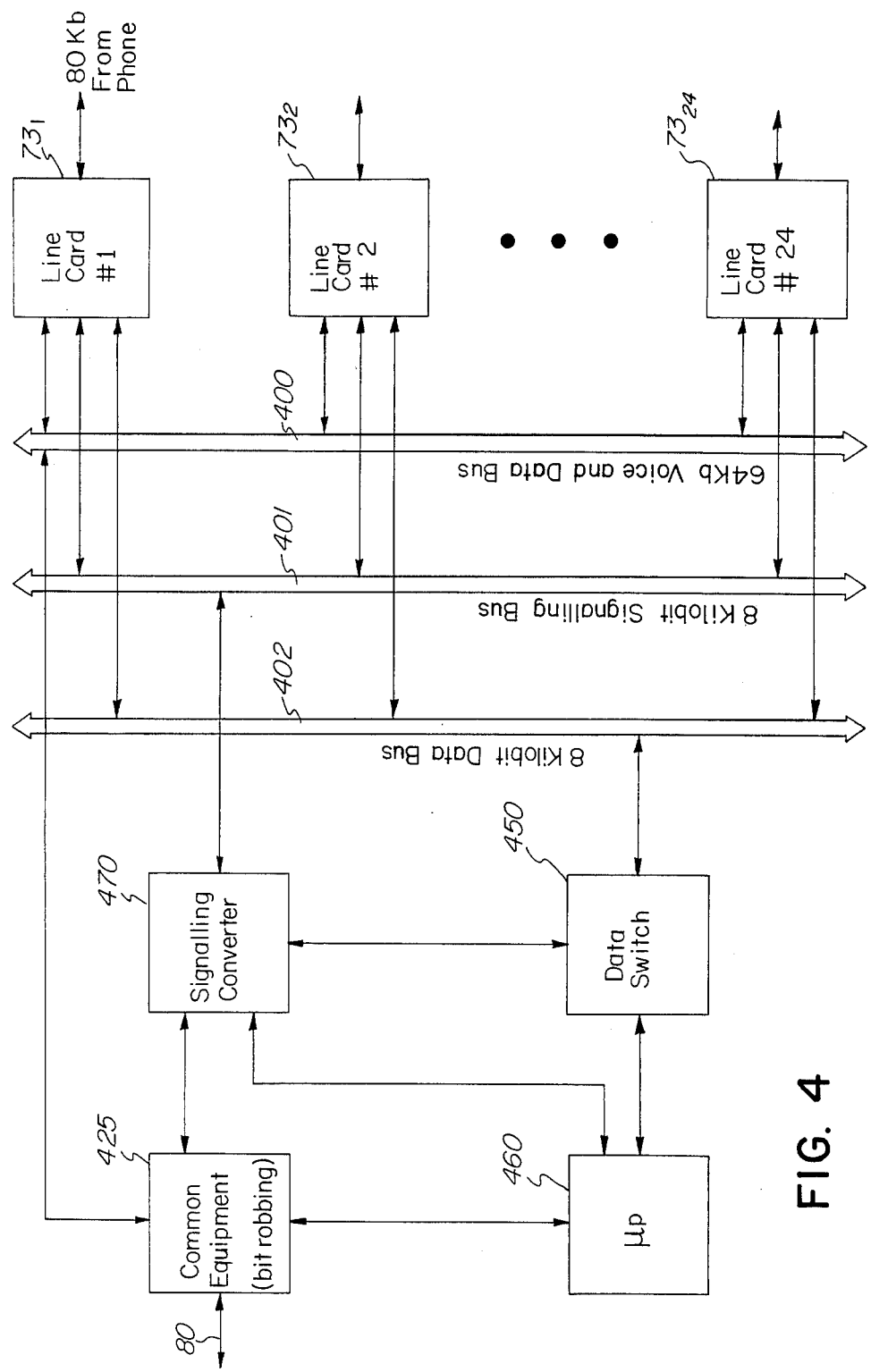
FIG. 4 is a more detailed block diagram of the multiplexer shown in FIG. 3.

FIG. 4 depicts the multiplexer 75 in more detail in that three separate signal-handling buses 400, 401 and 402 are shown. These signalling buses are inside the multiplexer 75 and are connected in common to all of the line interface cards $73_1$ through $73_{24}$ (one each per telephone line). Bus 400 is a voice bus. Signals on this bus are supplied to the common equipment 425. Bit robbing takes place within the common equipment 425 and goes out over a T-1 span 80 in standard fashion. Bus 401 is exclusively devoted to signalling and supervision at a rate of 8 kb/sec. per card. Bus 402 is exclusively used in accordance with this invention for data at a rate of 8 kb/sec. per card.

A data switch 450 is controlled by a microprocessor 460, which processor in response to signalling information received over 460 accommodates the various user-selected modes of operation. Signalling converter 470 temporarily stores the identity of each user station's line card and also temporarily stores the routing and control information for each user selected mode of operation at each user station. Microprocessor 460 repeatedly sequences through the twenty-four stations by reading the respective information stored in signalling converter 470. Assume, for example, that a user at station no. 1, associated with line card no. 1, 73, selects an operation to send data locally, and not over the T-1 span. Such a command is temporarily stored at 470 and it is read by microprocessor 460 during the timing period allotted for station no. 1. Microprocessor 460 responds to that command by operating data switch 450 so that the data is routed locally. Similarly if simultaneous voice and data is to be routed over the T-1 span 80, microprocessor 460 will respond to that command by bit robbing as necessary in common equipment 425. The microprocessor 460 also controls a data switch 450 and the signalling bus 402 to selectively combine signals via the common equipment 425, when such signals are to be sent over T-1 span 80.

Figure 5A:
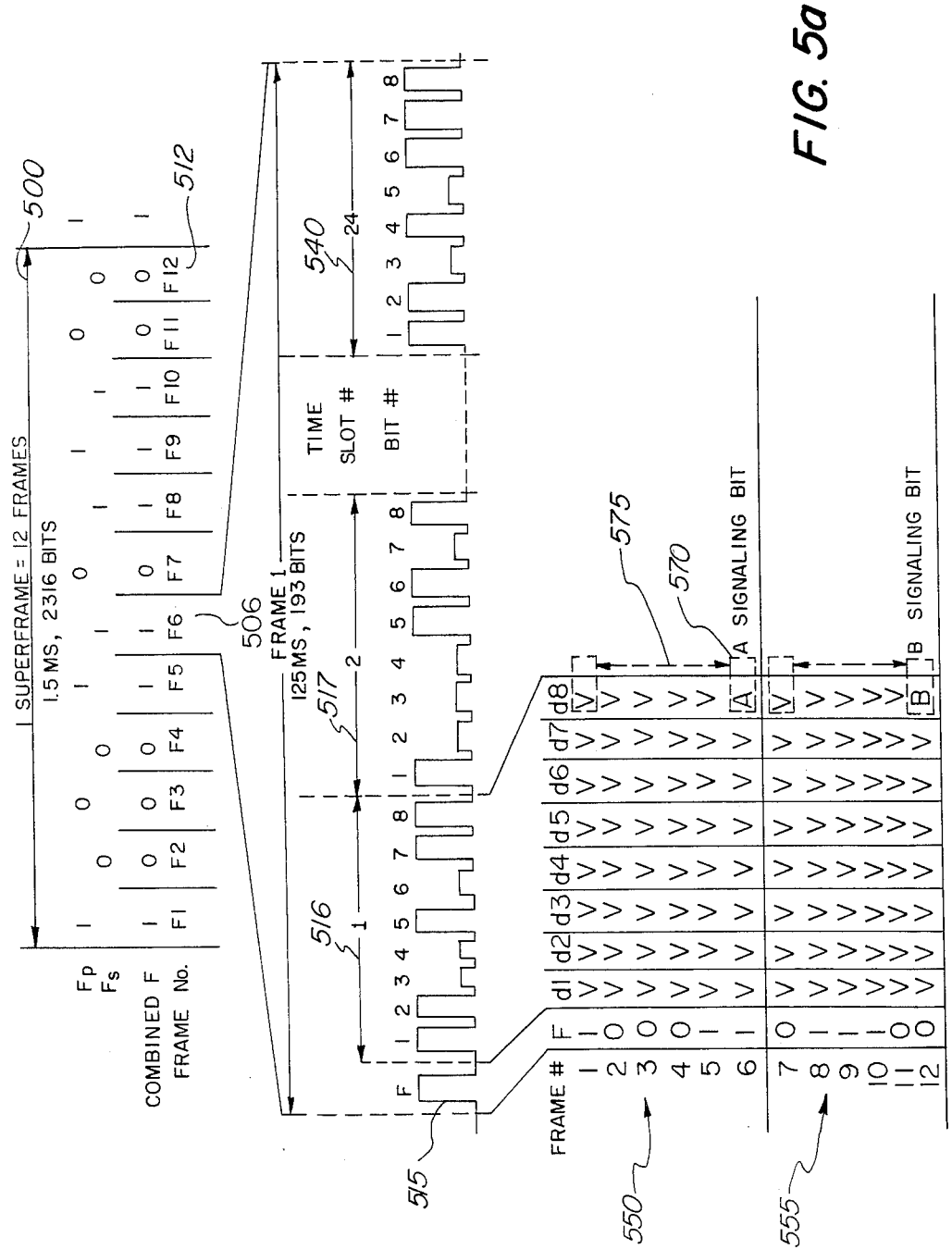

FIG. 5a depicts the standard mode of operation of todays T-1 systems and, more particularly, the timing and frame formats for a standard D4 channel bank. Although FIG. 5a is prior art, a description at this point will emphasize the novel features of this invention (FIG. 5b) as compared to prior art FIG. 5a.

A standard T-1 bit and frame format for a D4 channel bank unit comprises a superframe 500, which includes twelve sequential frames (numbered 1 through 12), with each frame comprising an initial frame synchronizing bit 515 followed by twenty-four eight bit words 516 through 540.

In FIG. 5a, the 6th frame 506 of super frame 500 is shown in an expanded time chart. The 6th frame 506 and the 12th frame are specifically reserved to carry signalling information. The eight bit in each eight-bit word within the 6th and 12th frames is reserved for storing T-1 signalling information. Digitized voice at 64 kilobits per second, as shown by the letter "V" in charts 550, 555 may use all eight bits of all the words in every frame, except the 6th and 12th frames wherein all seven bits, exclusive of those assigned for signalling, may be used for voice.

We have noted that, although the least significant bit location is reserved by the telephone operating companies for T-1 transmission, it is done without any absolute superframe reference time on a system-wide basis. Stated differently, the 6th and 12th frame locations are assigned for T-1 transmission at each remote, central office or satellite center without regard to received frame identities. Thus reservation of the least significant bit position for signalling purposes, as far as a non-telephone equipment supplier is concerned, must be thought of as a window which randomly slides, six frames apart, up and down the twelve frames as indicated by the dashed lines 570 and the dashed double-headed arrow 575. It is generally conceded that the loss of any two least significant bit locations from all of the frames (statistically, speaking) does not seriously detract from the voice quality.

This invention utilizes a frame and bit format which is not only compatible with existing T-1 carrier systems but uniquely provides enhanced voice and data capabilities. The format for this invention is depicted in FIG. 5b. The superframes in FIGS. 5a and 5b are understood to be the same. Again, a superframe comprises twelve frames and bit-robbing for an "A" and a "B" signalling bit is reserved for the 8th digit, or least significant bit position, in the six and twelfth frames.

In accordance with this invention, voice is encoded using an eight bit encoding codec, as is conventional for FIG. 5a. Once a call with this invention has been established between two users equipped with this invention, the users may elect to go with simultaneous voice and data. In order to accomplish this simultaneous operation the seventh bit of encoded voice for every frame is moved into the eighth digit location. Note $V_7$ is shown under the d8 column in FIG. 5b. In this invention the location d7 is reserved for simultaneous data. Reserving that bit location for data assures enough space for 9600 bits per second asynchronous data transmission. At the transmitter location the "A" and "B" signalling bits are inserted at the sixth and twelfth frame locations (see common equipment 425 at FIG. 4). While the telephone company may slide those locations within a superframe as described earlier, at least six full bits of truncated voice is guaranteed. Six-bit truncated voice provides sufficient voice quality where only one A/D and D/A conversion will occur, as is the case in this invention.

A commercially available integrated circuit, such as a Motorola MC 145428 converts the 9600 bps asynchronous data string into a synchronous data stream. This conversion occurs within digitizing unit 50, FIG. 3. This converted data is then later inserted into the 7th digit position of every frame. The insertion takes place at line card unit 73, FIG. 3.

Figure 6:
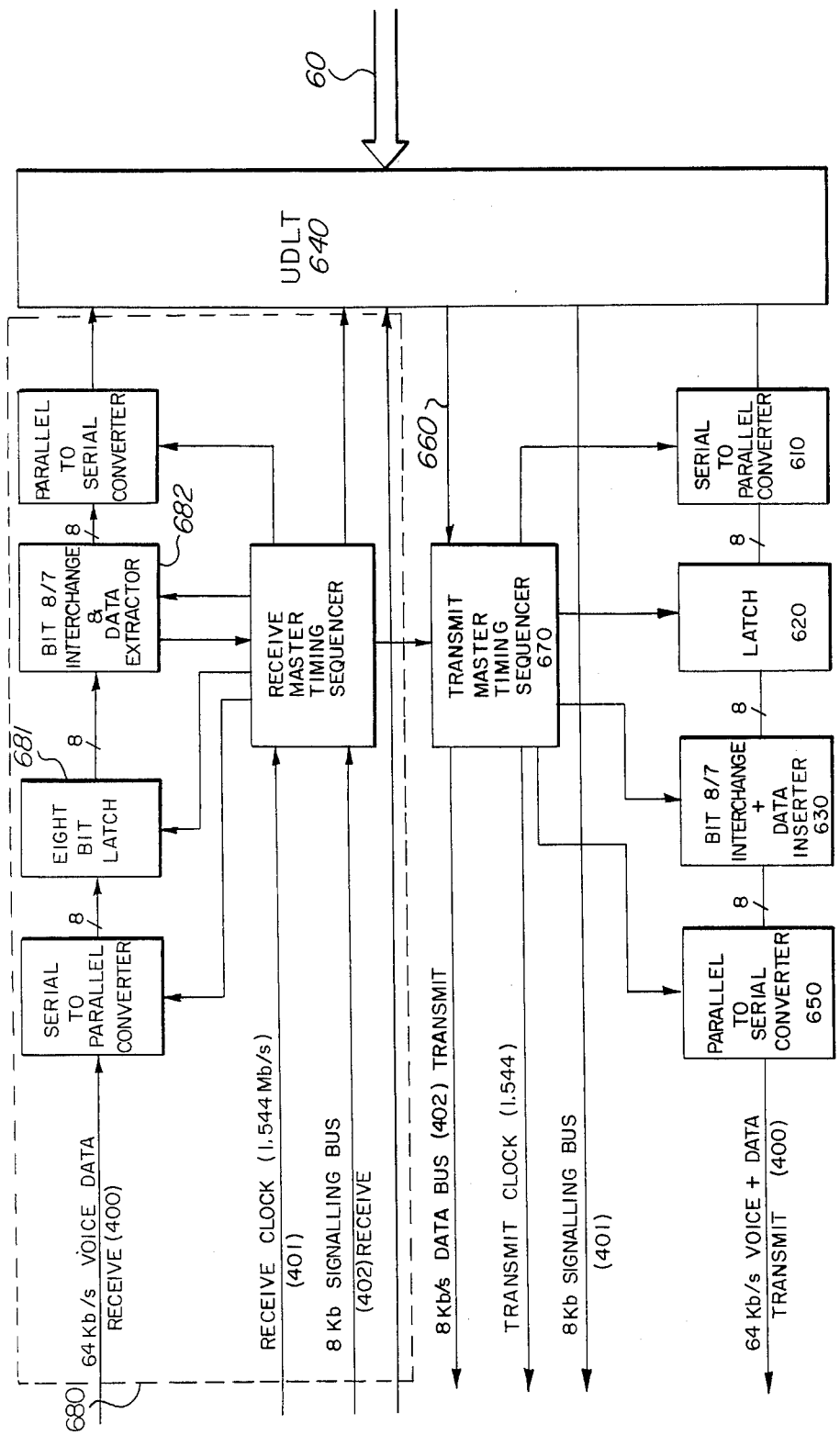
FIG. 6 is a block diagram depicting a line card for practicing the method and apparatus of this invention.

FIG. 6 depicts how FIG. 5b is implemented by conventional well-known circuit components. The designated labels and numbers of FIG. 4 are repeated in FIG. 6, except that the two way convention used in FIG. 4 has been drawn in two one-way directions. For example, the two-way 8 kb/sec. data bus 402 (FIG. 4) is shown as a separate transmit-and-receive bus in FIG. 6.

In FIG. 6, the digitized voice from the telephone is presented at a transmit lead 660 from another UDLT 640. A serial-to-parallel converter 610 takes one eight bit serial voice sample and, working with latch 620, obtains one eight bit parallel sample. Circuit 630 functions to pass the first six bits directly on out through circuit 650. Circuit 630 discards the eighth sample bit and moves the seventh sample bit into the eighth bit position. A data bit on lead 660 is applied through 670 to circuit 630. Circuit 630 inserts the data bit into bit position 7 (d7, FIG. 5b). Note in FIG. 5b that voice bit $V_7$ has been moved into position d8 by circuit 630. Bit interchange and insertion circuitry 630 is well known and no further detailed description is necessary. For example, a well known quad 2-input multiplexer will readily suffice as circuit 630.

Dashed lines defining box 680 perform the reverse function. Note, for instance, that latch 681 and circuit 682 will extract the data from d7 and will move the voice from d8 into position d7, position d8 is loaded with a logic zero. The presence of that logic zero does not cause any noticeable degradation of voice quality.

The above-described mode of simultaneous voice and data is totally transparent to the digital central office and terminal locations, which are equipped with a T-1 channel banks. If for some reason a previously all-digital path were to be switched over to one that includes an analog central office, the digitized voice will still function normally although it is degraded slightly, because noise would fill the d7 location used for data and the signalling bit locations as well.

At the option of the user of this invention, three data modes are available. Data transmission mode "one" uses the 64 kb/sec. capability of the T-1 span for transmission of 56 kb/sec. synchronous or 300 b/sec. to 38.4 kb/sec. asynchronous data only. This mode precludes the use of the telephone for any voice operation. Digital host switches at each user location and a true digital connection between both locations is mandatory. A call setup is performed by placing the telephone in the data, mode "one", and then dialing the desired telephone number. The digital telephone multiplexer performs no voice routing in this mode and thus a true all-digital central office or digital PBX must be used. When the answer supervision (signalling) bits are returned to the digital telephone multiplexer from the host digital switch, the digital telephone will indicate to the data source that the data connection has been established.

For data transmission mode "two", the data is carried within the 8 kb/sec. data channel to users within the group of, for example, four digital telephone multiplexers. This data transmission is independent of the 64 kb/sec. T-1 span and thus the 64 kb/sec. channel is not used at all. All signalling and supervision is carried out over the 8 kb/sec. supervisory channel. Call setup in this mode is performed manually by placing the telephone in data mode "two" and then dialing the appropriate extension number within the four groups served by the four multiplexers. This mode is always available and is independent of the nature of the host switch.

For data transmission, mode "three", the data and voice format depicted in FIG. 5b is employed. Call setup and the simultaneous voice and data capability is a unique feature provided by this invention.

The above description presents the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. A user-selectable system for communicating over a standard T-1 span connected over digital switches in a patch between users, wherein the T-1 format comprises a superframe having a plurality of sequential frames with each frame comprising a synchronizing pulse followed by a predetermined number of sequential time slots, with each time slot having a fixed number of bit positions from a most to least-significant bit position and further wherein the least significant bit positions in selected frames of every superframe is reserved without regard to received frame identity for T-1 signalling bits inserted by T-1 equipment free of any control by said user, said system comprising:
    encoding means for digitizing voice samples to an encoded number equal to said fixed number of bit positions;
    a source of synchronized data at said user's location and under his control;
    means available to a user at a user's station for commanding that the user's digitized encoded voice from said encoding means and synchronized data from said user's data source be simultaneously transmitted over one part of said T-1 span;
    means responsive to said user's command regarding voice and data for discarding the least significant bit position of said encoded voice sample from a user's location and moving the next-to-least significant bit position of said encoded voice sample into said bit position of said frames reserved for said T-1 signalling bits whereby said bit position previously occupied by said next-to-least significant bit position of said encoded voice sample is unoccupied;
    means also responsive to said user's command regarding voice and data for inserting data in said unoccupied bit position of said encoded voice sample; and
    means for interleaving said user's data, voice samples and allowing the telephone companies' T-1 signalling bits to be placed in the proper location during the time slots of the selected frames in each superframe free of any user's control.

2. A system in accordance with claim 1, wherein each time slot has eight bit positions and said discarding and data inserting means further comprises
    means for placing the seventh bit of encoded voice into the eighth bit position in each time slot;
    means for inserting a data bit into the seventh bit position in each time slot; and
    means for inserting said T-1 signalling bits into the eighth bit position of said time slots in said selected frames of said superframe.

3. A system in accordance with claim 1 and further comprising
    a plurality of user stations, each of which may be equipped with a telephone and a source of data;
    means at each of said user stations selectively operable for emitting simultaneous voice and data; and
    multiplexing means connected between a user and a T-1 span for time division multiplexing onto said T-1 span from each one of said plurality of user stations data, voice and T-1 signalling information.

4. A system in accordance with claim 3 and further comprising
    a digital telephone at each user station, said telephone including said encoding means for encoding voice into the number of bit positions available for a time slot assigned to that station.

5. A system in accordance with claim 4 and further comprising
    logic means at each station controlled by a user's key pad for outputting digitized voice and data for delivery to said multiplexing means.

6. A system in accordance with claim 5 wherein
    said digitized voice is at a rate of 64 kb/sec. said data is at a rate of 8 kb/sec. and said signalling information is at a rate of 8 kb/sec. from each station; and further comprising an 80 kb/sec. transmission line connecting each station to said multiplexing means.

7. A system in accordance with claim 5 and further comprising
    means at each station for sending routing commands to said multiplexing means; and
    means at said multiplexer responsive to said routing commands for routing data to other user stations connected to said multiplexing means or for routing data, digitized voice and signalling commands over said T-1 span.

8. A system in accordance with claim 7 and further comprising
    twenty-four user stations connected to each multiplexing means; and
    a T-1 span operating at 1.544 Mb/sec. connecting each multiplexing means to a T-1 port at a digital central office.

9. A system in accordance with claim 1 and further comprising
    a line card for each user location with said line cards being included within said interleaving means.

10. A system in accordance with claim 9 and wherein said interleaving means further comprise
a multiplexing means serving a predetermined number of said user stations.

11. A system in accordance with claim 10 and further comprising
common equipment at said multiplexing means for inserting said T-1 signalling bits in said information to be transferred over said T-1 span.

12. A system for communicating over a standard T-1 span connected in a communication path between users and over digital switches, wherein the T-1 format comprises a superframe having a plurality of sequential frames with each frame comprising a predetermined number of sequential time slots, with each time slot having a fixed number of bit positions from a most to least significant bit position and further wherein the least significant bit positions in a fractional part of every superframe is reserved for T-1 signalling bits, said system comprising:
encoding means for digitizing voice samples by limiting each sample to an encoded number of bit positions from a most to least-significant voice bit, which number is equal to said predetermined number of bit positions in said time slots;
a source of data at each user location having a transmission speed adapted to fit within one bit position in each time slot of each frame assigned to said user location;
means for separating the least and next-to-least significant bits in the digitized voice samples from said user location and assigning the next-to-least significant encoded voice sample bit to the least significant time slot bit position including those time slot bit positions reserved for T-1 signalling bits;
means for assigning the data from said data source to the next-to-least significant bit position in each time slot; and
means available to a user for simultaneously commanding that said time slot including combined voice and data be transmitted over said T-1 span.

13. A system in accordance with claim 12 wherein each time slot has eight bit positions and further comprising
means for placing the seventh bit of encoded voice into the eighth bit position in each time slot;
means for inserting a data bit into the seventh bit position in each time slot; and
means for inserting said T-1 signalling bits into the eighth bit position of said time slots in said frames making up a fractional part of said superframe.

14. A system in accordance with claim 12 and further comprising
a plurality of user stations, each of which may be equipped with a telephone and a source of data; and
means connected between said plurality of users and a T-1 span for time division multiplexing onto said T-1 span data, voice and T-1 signalling information.

15. A system in accordance with claim 14 and further comprising
a digital telephone at each user station, said telephone including said encoding means for encoding voice into the number of bit positions available for a time slot assigned to that station.

16. A system in accordance with claim 15 and further comprising
logic means at each user station controlled by a user's key pad for outputting digitized voice and data for delivery to said multiplexing means.

17. A system in accordance with claim 16 wherein
said digitized voice is at a rate of 64 kb/sec. said data is at a rate of 8 kb/sec. and said signalling information is at a rate of 8 kb/sec. from each station; and further comprising
an 80 kb/sec. transmission line connecting each station to said multiplexing means.

18. A system in accordance with claim 17 and further-comprising
means at each station for sending routing commands to said multiplexing means; and
means at said multiplexer responsive to said routing commands for routing data to other user stations connected to said multiplexing means or for routing data, digitized voice and signalling commands over said T-1 span.

19. A system in accordance with claim 14 wherein said plurality further comprises
twenty-four user stations each connected to one each of a plurality of multiplexing means; and
a T-1 span operating at 1.544 Mb/sec. connecting each one of said multiplexing means to a T-1 port at a digital central office.

20. A system in accordance with claim 19 and further comprising
common equipment at each of said T-1 signalling bits in said information to be transferred over said T-1 span.

21. A method for communicating over a standard T-1 span connected over digital switches in a patch between users, wherein the T-1 format comprises a superframe having a plurality of sequential frames with each frame assignable to a user by a telephone utility free of the user's control and each frame comprising a synchronizing pulse followed by a predetermined number of sequential time slots, with each time slot having a fixed number of bit positions from a most to least-significant bit position and further wherein the least significant bit positions in selected frames of every superframe is reserved by said utility without regard to received frame identity for T-1 signalling bits inserted by T-1 equipment free of any control by said user, said method comprising the steps of:
digitizing a user's voice samples to an encoded number of bit positions equal to said fixed number of bit positions in said frames;
placing data, voice samples and T-1 signalling bits during the time slots of selected frames in each superframe;
allowing a user to command that digitized voice and the user's own data be simultaneously transmitted from one user location over one port of said T-1 span;
discarding in response to said user's command the least significant bit position of said digitized voice sample, leaving the next-to-least significant position of said digitized voice sample temporarily unoccupied;
moving in response to said user's command, the next-to-least significant voice sample to the bit position in said frame reserved for said T-1 signalling bit;
placing in response to said user's command, said user's data from said one user location in the previously unoccupied bit position of the time slots assigned to said one user; and simultaneously transmitting both the user's encoded voice and the user's data over telephone company equipment provided with said T-1 span and T-1 format.

22. A method in accordance with claim 21 wherein each time slot has eight bit positions and said method further comprises:

placing the seventh bit of encoded voice into the eighth bit position in each time slot;
inserting a data bit into the seventh bit position in each time slot; and
inserting said T-1 signalling bits into the eighth bit position of said time slots in said selected frames of said superframe.

* * * * *